United States Patent [19]

Florence

[11] Patent Number: 4,992,015
[45] Date of Patent: Feb. 12, 1991

[54] CARGO TIE-DOWN ANCHOR

[76] Inventor: Glen A. Florence, 39745 Silvia, Mt. Clemens, Mich. 48045

[21] Appl. No.: 295,584

[22] Filed: Jan. 11, 1989

[51] Int. Cl.$^5$ .............................................. F16B 37/08
[52] U.S. Cl. ...................................... 410/104; 410/101
[58] Field of Search .................... 410/10, 11, 104, 116, 410/105, 110, 101, 130, 132, 139, 150, 8; 411/178; 248/429

[56] References Cited

U.S. PATENT DOCUMENTS

| 888,931 | 5/1908 | Robinson . |
| 2,209,881 | 7/1940 | Frankman . |
| 2,292,414 | 8/1942 | Vernon . |
| 2,589,922 | 3/1952 | Bowman . |
| 2,605,064 | 7/1952 | Davis . |
| 2,688,289 | 9/1954 | Sterling . |
| 2,735,476 | 2/1956 | Fieber . |
| 3,430,531 | 3/1969 | Bosse ................................. 411/178 |
| 4,157,797 | 6/1979 | Fox . |
| 4,237,794 | 12/1980 | Biaggini et al. . |
| 4,278,376 | 7/1981 | Hunter . |
| 4,464,089 | 8/1984 | Allen ................................. 410/101 |
| 4,509,888 | 4/1985 | Sheek . |
| 4,595,164 | 6/1986 | Froutzis et al. . |
| 4,717,298 | 1/1988 | Bott . |

OTHER PUBLICATIONS

Cessna Pilots Association–Magazine–Sep. 1987.

Primary Examiner—Matthew C. Graham
Attorney, Agent, or Firm—Basile and Hanlon

[57] ABSTRACT

A tie-down anchor for securing cargo to a rail mounted on a surface. The anchor includes a body with a longitudinal bore extending therethrough configured to slidably mate with the rail. A transverse bore is formed in the body and receives a threaded sleeve formed of a high strength material. A threaded bore formed in the sleeve extends through the sleeve into communication with the longitudinal bore in the body. A retaining ring carrying a threaded shaft is threadingly engageable through the sleeve into registry with the rail to fix the body in a fixed position on the rail.

2 Claims, 1 Drawing Sheet

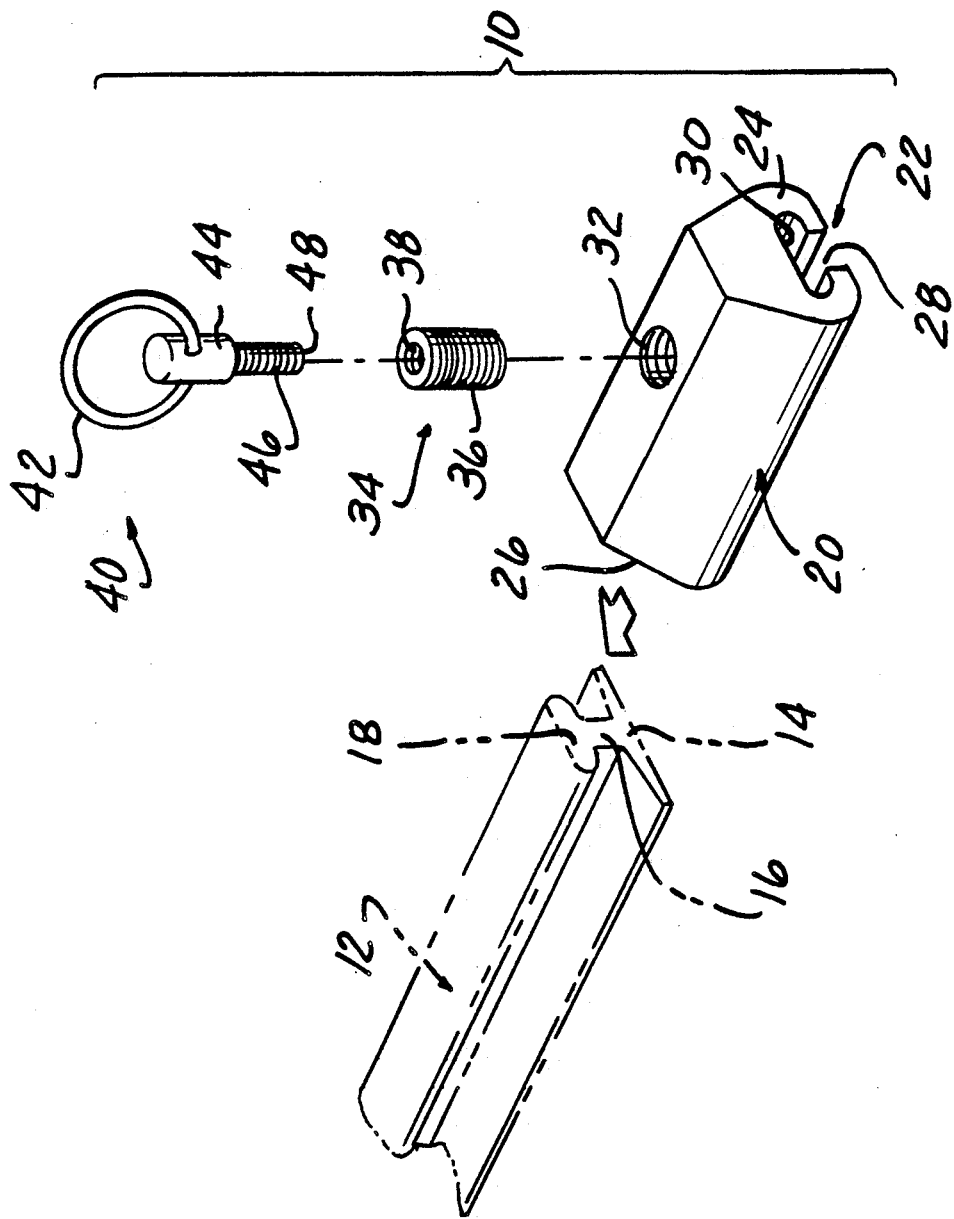

4,992,015

CARGO TIE-DOWN ANCHOR

BACKGROUND OF THE INVENTION

Field of the Invention

The present invention relates to cargo tie-down anchors for use in aircraft, boats and vehicles.

In transporting various types of cargo or freight, tie-down anchors are typically employed for attaching straps encircling the cargo to rails in the transport vehicle. Such rails are typically mounted on the floor or other surface within the vehicle and slidably receive the tie-down anchors. The anchors carry a retaining ring to which a cargo restraining strap may be attached to securely hold the cargo in a secure, fixed position during transport.

Such previously constructed anchors are laborous in construction and usually require welding and final heat treating. Further, such construction necessitates the use of high strength materials and requires expensive roll forming equipment to shape the anchor which places a high capital burden on the component. Because of the low volume of aircraft production, the laborous construction, welding and capital burden result in a high manufacturing and price cost for such cargo tie-down anchors.

Thus, it would be desirable to provide a cargo tie-down anchor which is inexpensive in cost and can be easily manufactured.

SUMMARY OF THE INVENTION

The present invention is a tie-down anchor used to secure cargo in a fixed position during transport. The tie-down anchor is secured to a rail mounted on a support surface in a vehicle, aircraft, boat, etc. and is slidingly positionable along the length of the rail to an any desired position.

The anchor is in the form of an extruded body having a longitidudinal bore extending therethrough configured to slidably mate with the rail. A transverse threaded bore is formed in the body and receives a threaded sleeve formed of a high strength material. The threaded bore formed in the body extends completely through the body into communication with the longitudinal bore in the body.

A retaining ring carries a threaded shaft which is threadingly engageable through the bore in the sleeve into engagement with the rail to fix the body at a predetermined position on the rail and to receive a cargo restraining strap to secure cargo in a fixed position.

In a preferred embodiment, the body of the present cargo tie-down anchor is formed of a low cost, easily machinable and extrudable material, such as an aluminum alloy. The sleeve is formed of a high strength material, such as steel, to provide the necessary high strength needed to securely restrain cargo in a fixed position. The threaded sleeve provides durable wear resistant threads and lowers thread stress on the body due to the large outside diameter of the sleeve.

This construction enables a low cost anchor body to be formed; yet an anchor having the requisite high strength needed to restrain cargo in a fixed position. This eliminates the need for forming the entire body out of a high strength material which is difficult to machine or extrude. This simplifies the construction of the cargo tie-down anchor and results in a cargo tie-down anchor having a low manufacturing cost.

BRIEF DESCRIPTION OF THE DRAWING

The various features, advantages and other uses of the present invention will become more apparent by referring to the following detailed description and drawing which illustrates an exploded, perspective view of the cargo tie-down anchor of the present invention slidingly mountable on a cargo rail.

DESCRIPTION OF THE PREFERRED EMBODIMENT

As shown in the drawing, reference number 10 depicts a cargo tie-down anchor constructed in accordance with the teachings of the present invention. The tie-down anchor 10 is mountable on any suitable cargo support rail 12 which may have any desired configuration. The rail 12 is typically mounted on a support surface in a transport vehicle, such as an aircraft, boat, truck, etc. Further, in a preferred embodiment, the rail 12 may comprise the existing seat track found in certain aircraft as disclosed in greater detail in my co-pending patent application serial number 061,269, filed June 12, 1987, the contents of which are incorporated herein in their entirety by reference.

As shown in the drawing, the rail 12 has a generally inverted T-shape formed of a planar base 14 mountable by fasteners, not shown, to a support surface in a transport vehicle. A stem 16 extends away from the base 14 and terminates in an enlarged anchor engaging section 18. The outer ends of the anchor engaging section 18 overhang the sides of the stem 16.

The tie-down anchor 10 includes a body 20 formed of a solid material, such as aluminum. A low strength aluminum, such as an aluminum alloy 6061, may be employed as it is easy to extrude to the desired shape. Alternately, other extrudable, soft materials, such as magnesium or plastics, may also be employed to form the body 20.

The body 20 includes a longitudinally extending bore denoted by reference number 22. The bore 22 extends completely along the length of the body 12 between the opposed ends 24 and 26 of the body 20. The bore 22 has a shape complimentary to the shape of the stem 16 and the anchor engaging section 18 of the rail so as to be slidably disposed along the length of the rail 12 to any desired position. The bore 22 is formed with an open end 28 which communicates with an enlarged generally rectangular section 30 complimentrally shaped to the anchor engaging section 18. The stem 16 of the rail 12 fits between the open end 28 of the bore 22 to allow the body 20 to be slidably moved along the length of the rail 12.

A transverse bore 32 is formed in the body 20 and extends through the body 20 into communication with the longitudinal bore 22. The transverse bore 32 is threaded as shown in the drawing.

A cylindrical insert or sleeve 34 is formed with a plurality of external threads 36 which threadingly engage the threads in the transverse bore 32 in the body 20. The sleeve 34 also includes a throughbore 38 which is also threaded. The sleeve 34 is adapted to be threadingly inserted into the body 20 into threading engagement with the transverse bore 32, with the internal bore 38 in the sleeve 34 communicating with the longitudinal bore 22 in the body 20. The sleeve 34 is preferably formed of a high strength material, such as a high strength steel.

A retaining ring assembly 40 is threadingly insertable into the sleeve 34. The retaining ring assembly 40 includes a ring 42 adapted to receive a conventional restraining strap used to secure cargo to the anchor 10. A shaft 44 is fixedly or slidably mounted on the ring 42 and contains a plurality of external threads 46 formed adjacent one end 48. The threads 46 threadingly engage the internal threads in the bore 38 in the sleeve 32 such that the shaft 44 is threadingly extendible through the bore 38 until the end 48 of the retaining ring assembly 40 engages the top surface of the anchor engaging section 18 of the rail 12 to secure the body 20 in a fixed position on the rail 12.

In assembling and using the cargo tie-down anchor 10, the insert 34 is threaded into the transverse bore 32 in the body 20 and the retaining ring assembly 40 is then threaded into the sleeve 34, with the end 48 of the retaining ring assembly 40 completely contained within the internal bore 38 in the sleeve 34 without extending outward from the end thereof. The body 20 is then slid along the length of the rail 12 to a predetermined position and the retaining ring assembly 40 tightened down until the end 48 of the shaft 44 engages the top surface 18 of the rail 12 to secure the body 20 in a fixed position to the rail 12.

What is claimed is:

1. A cargo tie-down anchor adjustably mountable on an elongated rail having an upstanding anchor engaging section, the cargo tie-down anchor being formed by the process comprising the steps of:

extruding a metallic material to form a body having a longitudinal bore extending therethrough configured to slidably engage the anchor engaging section of the rail;

forming a threaded bore in the body transverse to and communicating with the longitudinal bore in the body;

threadingly mounting a threaded sleeve having an internal threaded bore extending therethrough in the transverse bore in the body, the sleeve being formed of a metallic material having a higher strength than the body; and threadingly inserting a cargo retaining ring having a threaded shaft mounted thereon through the bore in the sleeve, such that when the cargo tie-down anchor is mounted on the anchor engaging section of the rail, the cargo retaining ring extends through the bore in the sleeve into engagement with the anchor engaging section of the rail to secure the body in a fixed position to the rail.

2. The tie-down anchor of claim 1 wherein the body is formed of aluminum and the sleeve is formed of steel.

* * * * *